(12) United States Patent
Ford

(10) Patent No.: US 10,648,635 B1
(45) Date of Patent: May 12, 2020

(54) HEADLAMP STRUCTURE

(71) Applicant: Nissan North America, Inc., Franklin, TN (US)

(72) Inventor: Sarah Ford, Fenton, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 16/173,684

(22) Filed: Oct. 29, 2018

(51) Int. Cl.
| | |
|---|---|
| *F21S 41/36* | (2018.01) |
| *F21S 41/33* | (2018.01) |
| *F21S 41/39* | (2018.01) |
| *B60Q 1/04* | (2006.01) |
| *F21S 41/151* | (2018.01) |
| *F21S 45/48* | (2018.01) |
| *F21Y 115/10* | (2016.01) |
| *G02B 5/12* | (2006.01) |

(52) U.S. Cl.
CPC .......... *F21S 41/36* (2018.01); *B60Q 1/0433* (2013.01); *F21S 41/151* (2018.01); *F21S 41/337* (2018.01); *F21S 41/39* (2018.01); *F21S 45/48* (2018.01); *F21Y 2115/10* (2016.08); *G02B 5/12* (2013.01)

(58) Field of Classification Search
CPC ........ F21S 41/36; F21S 41/337; F21S 41/151; F21S 41/39; F21S 41/198; B60Q 1/0433; G02B 5/12
See application file for complete search history.

(56) References Cited

U.S. PATENT DOCUMENTS

| | | | | |
|---|---|---|---|---|
| 5,552,969 A * | 9/1996 | Murakami | ........... | B60Q 1/2607 362/520 |
| 6,089,736 A * | 7/2000 | Tanaka | ..................... | B60Q 1/26 362/516 |
| 6,550,947 B1 * | 4/2003 | Kibayashi | .............. | B60Q 1/076 362/515 |
| 9,803,822 B1 * | 10/2017 | Salter | ..................... | F21S 43/33 |

(Continued)

OTHER PUBLICATIONS

Reflex Reflectors by Society of Automobile Engineers, Inc.; Jan. 1977.

(Continued)

*Primary Examiner* — Jong-Suk (James) Lee
*Assistant Examiner* — Christopher E Dunay
(74) *Attorney, Agent, or Firm* — Global IP Counselors, LLP

(57) ABSTRACT

A headlamp structure has a contoured reflector panel with a forward-facing surface and a reflex supporting portion. The forward-facing surface has a plurality of reflector surface portions. The reflex supporting portion extends forward from an inboard side inboard of the reflector surface portions. A passive reflector is attached to the reflex supporting portion with a reflector surface that faces an outboard direction relative to the forward-facing surface. Each of the plurality of reflector surface portions is shaped and configured to reflect light from a corresponding one of a plurality of light emitting elements and aim the reflected light to project in a forward direction parallel to the reflector surface of the passive reflector. The reflector surface of the passive reflector is configured such that at least light approaching the contoured reflector panel from outboard of an outboard side of the contoured reflector panel is reflected back in the outboard direction.

19 Claims, 8 Drawing Sheets

(56) References Cited

U.S. PATENT DOCUMENTS

| | | | |
|---|---|---|---|
| 2011/0255298 A1* | 10/2011 | Lindsay | G02B 6/0006 |
| | | | 362/511 |
| 2013/0314946 A1* | 11/2013 | Wilson | F21S 41/24 |
| | | | 362/612 |
| 2016/0281950 A1* | 9/2016 | Sato | B60Q 1/0041 |
| 2018/0029524 A1* | 2/2018 | Niessen | F21S 41/198 |
| 2018/0128444 A1 | 5/2018 | Suemitsu et al. | |
| 2018/0180240 A1 | 6/2018 | Shon et al. | |
| 2018/0283648 A1* | 10/2018 | Ramos, II | F21S 41/50 |
| 2019/0107265 A1* | 4/2019 | Yan | F21S 41/663 |

OTHER PUBLICATIONS

Cadillac CT6 2017.
Chevy Colorado 2017.
Ford F150 2017.
Nissan 2017.

\* cited by examiner

HEADLAMP STRUCTURE

BACKGROUND

Field of the Invention

The present invention generally relates to a vehicle headlamp structure that includes a contoured reflector. More specifically, the present invention relates to a contoured reflector of a headlamp structure that aims light emitted from the headlamp structure to shine in a forward direction of a vehicle, the contoured reflector also having a passive reflector fixedly attached to the contoured reflector that receives light shining from an outboard side of the vehicle (and the headlamp structure) and reflects at least a portion of that light in the outboard direction outboard of the headlamp structure.

Background Information

The S.A.E. (Society of Automotive Engineers) defines a reflex reflector as a device which is used on a vehicle to give an indication to an approaching driver by reflected light from the lamps on the approaching vehicle.

Reflex reflectors are typically used on bicycles and automotive vehicles. Reflex reflectors are not mirrors per se. Reflex reflectors are typically optic elements designed to take light aimed at the reflex reflector and return that light back in directions proximate the entrance angle of the light but with significantly reduced brightness, and with a small degree of angular displacement and/or diffusion.

SUMMARY

One object of the present disclosure is to provide a headlamp structure with a contoured reflector that aims headlamp light in a forward direction and includes a reflex supporting portion that extends in a forward direction approximately parallel to the forward direction, where a reflex reflector mounted to the reflex supporting portion reflects light in a vehicle outboard direction, the reflux supporting portion being integrally formed with the contoured reflector as a single, monolithic element.

In view of the state of the known technology, one aspect of the present disclosure is to provide a headlamp structure with a contoured reflector panel, a passive reflector and a plurality of light emitting elements. The contoured reflector panel has an inboard side, an outboard side, and a top side, a forward-facing surface and a reflex supporting portion. The forward-facing surface has a plurality of reflector surface portions that extend downwardly from the top side of the contoured reflector panel. The reflex supporting portion extends forward from the inboard side inboard of the plurality of reflector surface portions. The passive reflector is fixedly attached to the reflex supporting portion with a reflector surface of the passive reflector facing an outboard direction. The plurality of light emitting elements are located proximate respective upper ends of corresponding ones of the plurality of reflector surface portions. The plurality of light emitting elements emit light to the corresponding one of the plurality of reflector surface portions, with each of the plurality of reflector surface portions being shaped and configured to reflect light from the corresponding one of the plurality of light emitting elements and aim the reflected light to project in a forward direction parallel to the reflector surface of the passive reflector. The reflector surface of the passive reflector is configured and oriented such that at least a portion of light approaching the passive reflector from outboard of the outboard side of the contoured reflector panel is reflected back in the outboard direction.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
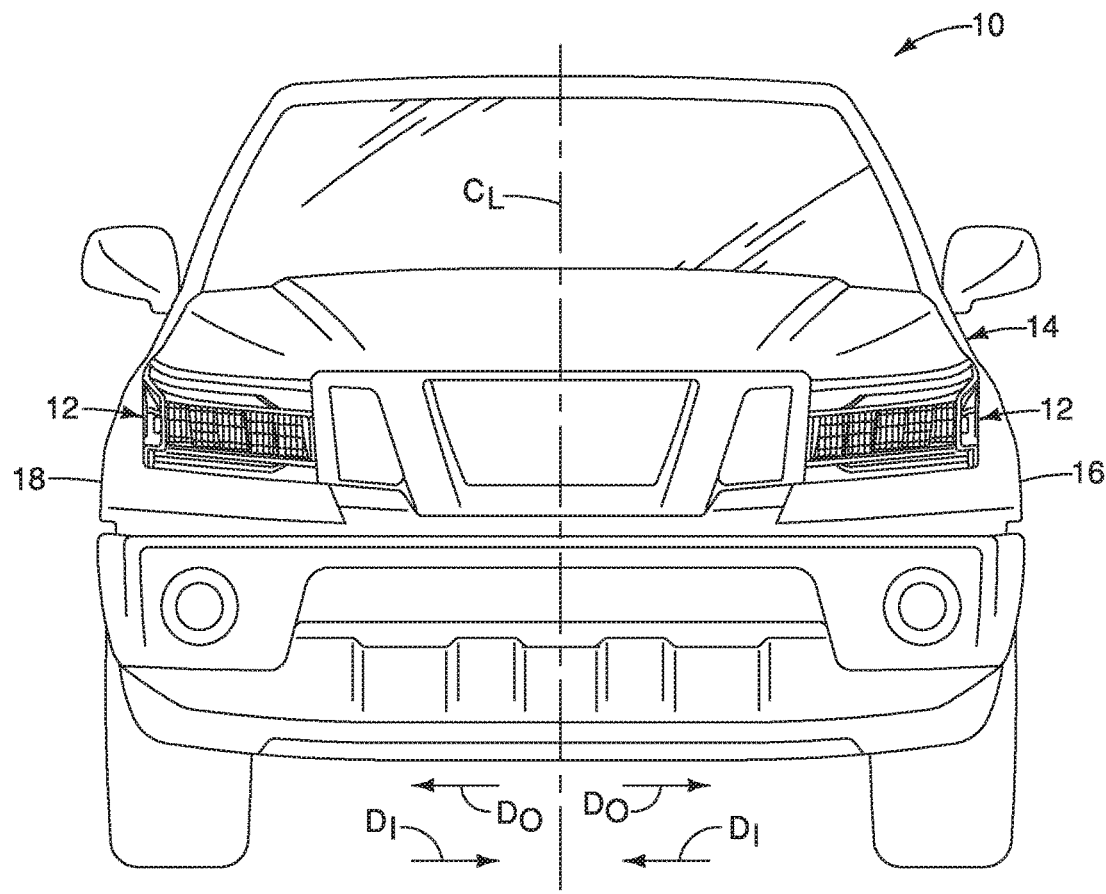
FIG. 1 is a front view of a vehicle showing a front end of the vehicle and a pair of headlamp structures in accordance with an exemplary embodiment.

Referring initially to FIG. 1, a vehicle 10 with headlamp structures 12 is illustrated in accordance with a first embodiment.

The front end of the vehicle 10 is depicted in FIG. 1. The vehicle 10 defines a plurality of conventional directions, such as a center line $C_L$, outboard directions Do (relative to the center line $C_L$) and inboard directions $D_I$ (relative to the center line $C_L$).

The vehicle 10 has a vehicle body structure 14 with a driver's side 16 and a passenger's side 18. There are two headlamp structures 12, each basically being the same with identical features, except that the headlamp structures 12 are symmetrically arranged with respect to one another, being mirror images of one another. One of the headlamp structures 12 is installed to the front end of the vehicle 10 at the driver's side 16 thereof, with the other of the headlamp structures 12 being installed to the front end of the vehicle 10 at the passenger's side 18 thereof, as shown in FIG. 1.

One of the headlamp structures 12 is depicted in FIGS. 2-6 removed from the vehicle 10. Since the two headlamp structures 12 are identical (but mirror images of one another), only one headlamp structure 12 is described herein, but applies equally to both headlamp structures 12.

Figure 2:
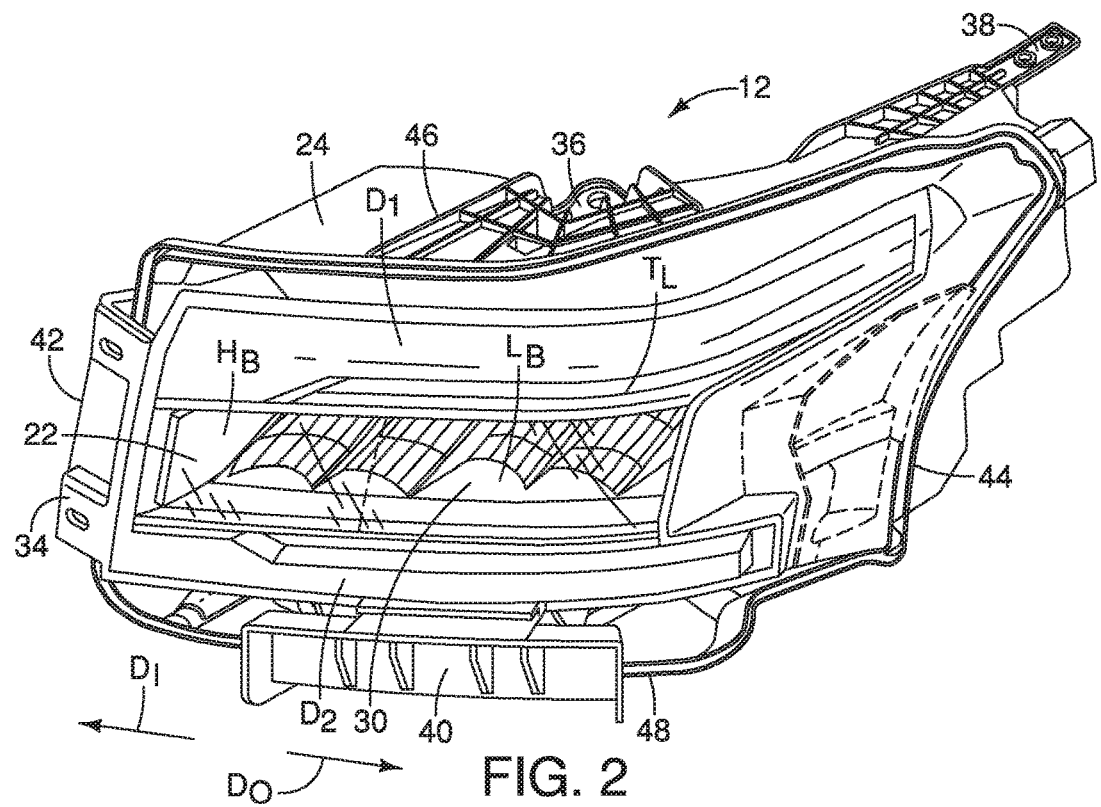
FIG. 2 is a perspective view of one of the headlamp structures removed from the vehicle showing a lens and a housing attached together in accordance with the exemplary embodiment.
Figure 3:
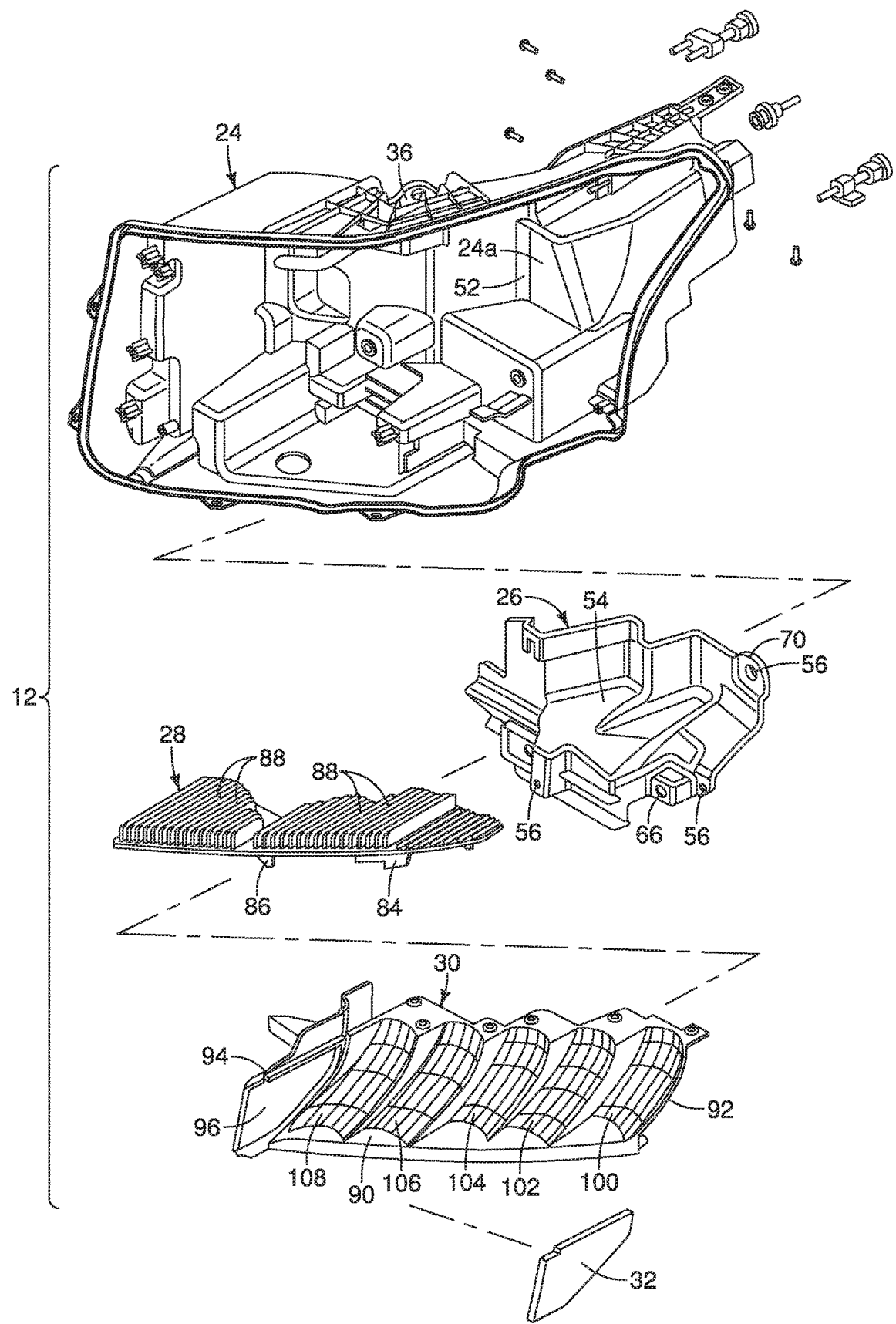
FIG. 3 is a perspective exploded view of the headlamp structure showing the housing, an aiming bracket, a circuit board, a contoured reflector panel and a reflex reflector, with the lens omitted in accordance with the exemplary embodiment.
Figure 4:
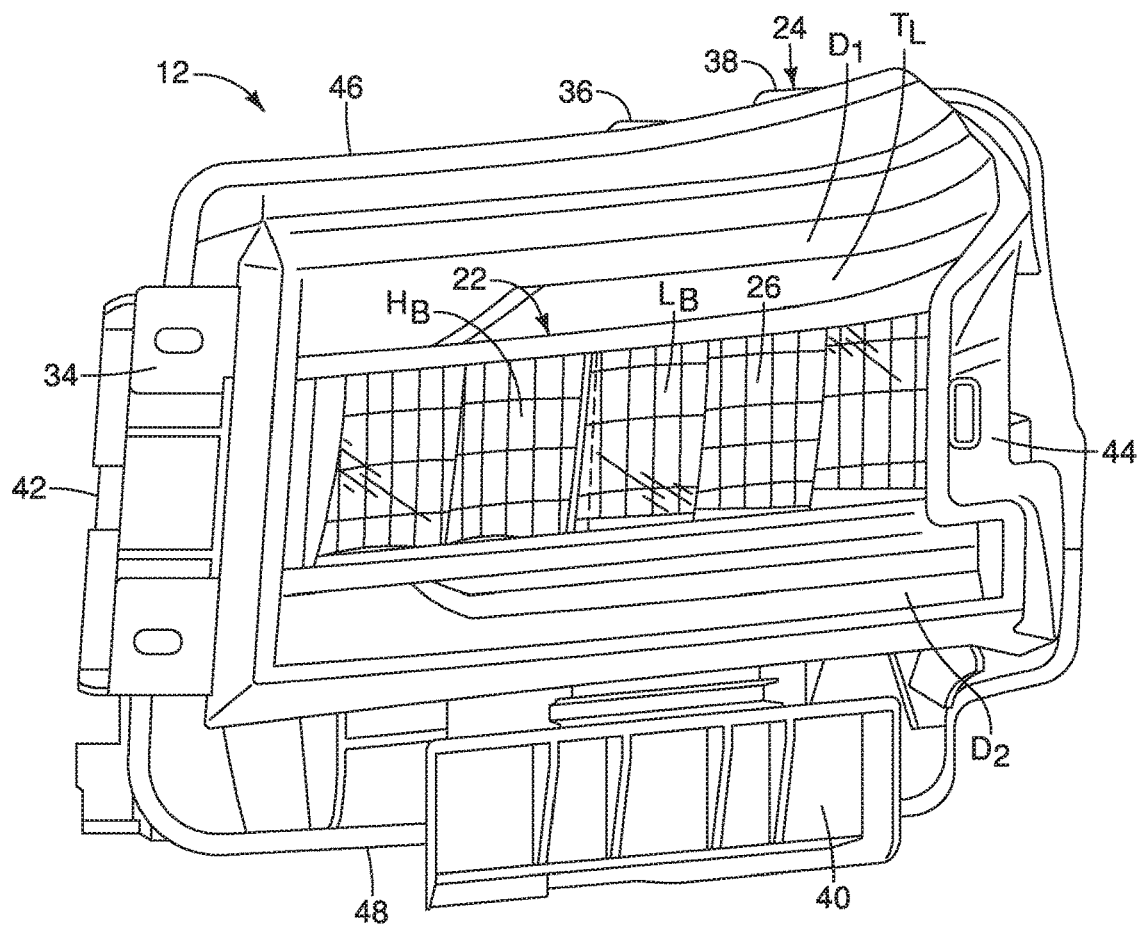
FIG. 4 is a front view of the headlamp structure in accordance with the exemplary embodiment.
Figure 5:
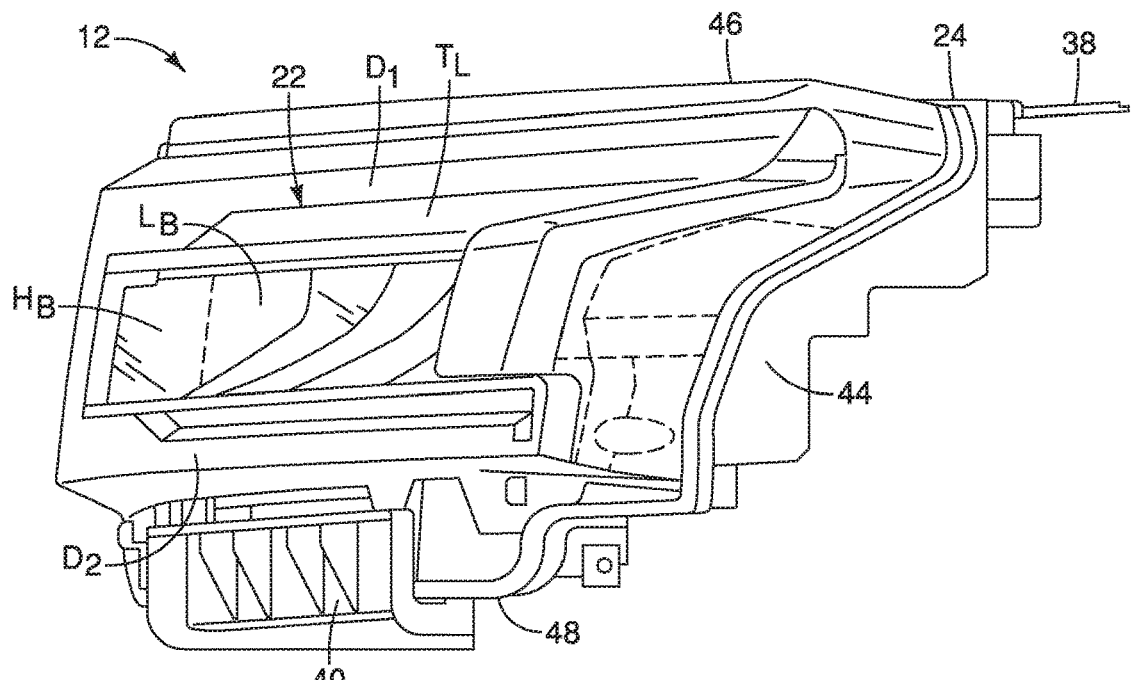
FIG. 5 is an outboard side view of the headlamp structure in accordance with the exemplary embodiment.
Figure 6:
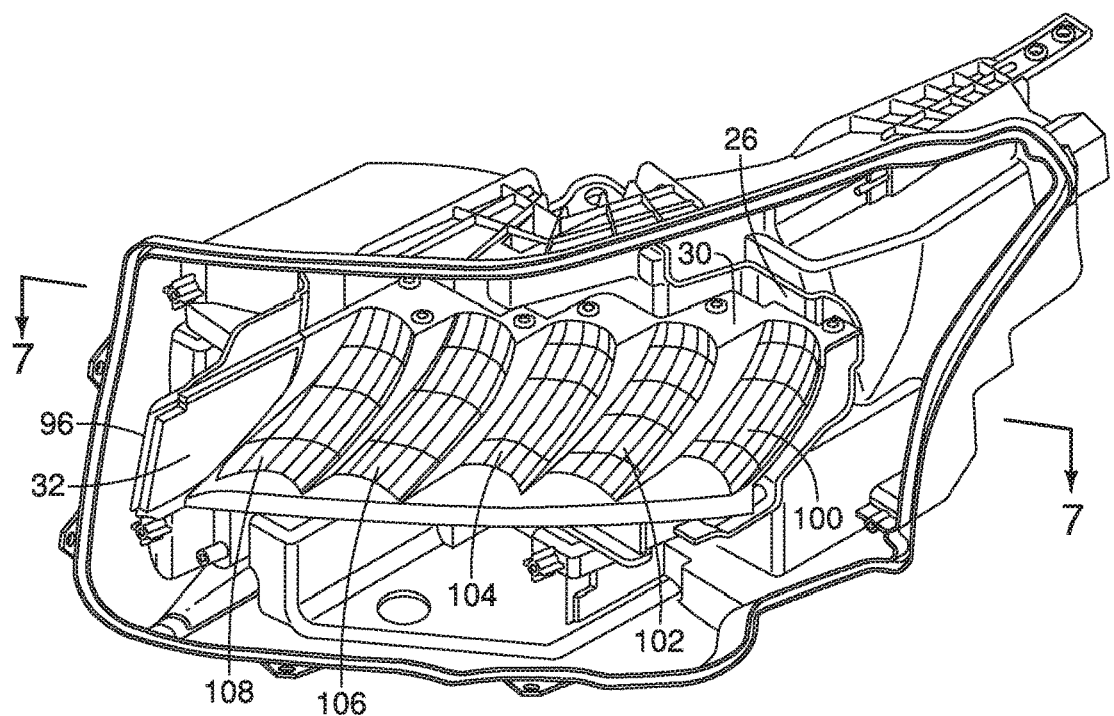
FIG. 6 is a perspective view the housing of the headlamp structure with the lens and circuit board removed, showing the aiming bracket, the contoured reflector panel and the reflex reflector installed within a lamp cavity of the housing in accordance with the exemplary embodiment.

FIG. 2 is a perspective view of the headlamp structure 12 shown removed from the driver's side 16 of the vehicle body structure 14 of the vehicle 10. FIG. 2 shows the headlamp structure 12 with a lens 22 attached to a housing 24. FIGS. 2, 4 and 5 show the headlamp structure 12 with the lens 22 fixedly attached to the housing 24. In FIGS. 3 and 6 the headlamp structure 12 is shown with the lens 22 removed and omitted for the sake of clarity and simplicity.

As shown in FIGS. 2, 4 and 5, the lens 22 includes a low beam lamp area $L_B$, a high beam lamp area $H_B$, a turn signal lamp area $T_L$, a first daytime lamp area $D_1$ and a second daytime lamp area $D_2$. In FIGS. 3, 6, 8 and 9 and the description below, the turn signal lamp area $T_L$, the first daytime lamp area $D_1$ and the second daytime lamp area $D_2$ are all omitted for the sake of brevity.

As shown in FIG. 3, is an exploded perspective view that shows the basic elements of the headlamp structure 12, except the lens 22 and elements that define a turn signal lamp of the turn signal lamp area $T_L$, a first daytime lamp of the first daytime lamp area $D_1$ and a second daytime lamp of the second daytime lamp area $D_2$, which are omitted for the sake of brevity.

The headlamp structure 12 basically includes the housing 24, an aiming bracket 26, a circuit board 28, a contoured reflector panel 30 and a reflex reflector 32. The aiming bracket 26, the circuit board 28 and the contoured reflector panel 30 are all installed within the housing 24, and, are then covered and sealed within the housing 24 by the attachment of the lens 22 to the housing 24.

As show in FIG. 2, the headlamp structure 12 includes at least first, second, third and fourth attachment flanges 34, 36, 38 and 40 that are used to secure the headlamp structure 12 to the vehicle body structure 14. The lens 22, the first attachment flange 34 and the fourth attachment flange 40 can be formed or molded together as a single element. Alternatively, the first attachment flange 34 and the fourth attachment flange 40 can be part of the housing 24. The first attachment flange 34 extends in the inboard direction $D_I$ from the lens 22 (and/or the housing 24), as shown in FIG. 2, and attaches an inboard side 42 of the headlamp structure 12 to the vehicle body structure 14 in a conventional manner. In the depicted exemplary embodiment, as shown in FIG. 2, an outboard side 44 of the headlamp structure 12 does not have any flanges. The fourth attachment flange 40 extends along a forward portion of a bottom side 48 of the lens 22. The fourth attachment flange 40 includes a series of surfaces that can engage and/or snap-fit to corresponding portions of a front fender or grill (not shown) at the front end of the vehicle body structure 14, in a conventional manner.

The second attachment flange 36 and the third attachment flange 38 are both part of the housing 24. More specifically, the second attachment flange 36 and the third attachment flange 38 are molded simultaneously with the housing 24 are made of the same material as the housing, such as a plastic, polymer or resin material, or any other suitable moldable material. The second attachment flange 36 and the third attachment flange 38 are formed along mid and rearward areas, respectively, at the top side 46 of the housing 24. The second attachment flange 36 and the third attachment flange 38 each include one or more fastener openings for fixing the headlamp structure 12 to the vehicle body structure 14. With the headlamp structure 12 installed to the vehicle body structure 14, and with fenders, front grill and trim elements fully installed to the vehicle 10, the first, second, third and fourth attachment flanges 34, 36, 38 and 40 are all concealed, as shown in FIG. 1.

As shown in FIG. 3, the housing 24 (also referred to as a headlamp housing 24) includes a main body 50 that defines a lamp cavity 52. The top side 46 of the housing 24 includes the second and third attachment flanges 36 and 38, as described above. The lamp cavity 52 is dimensioned to receive the aiming bracket 26, the circuit board 28 and the reflector 30 in a manner described further below. The housing 24 further includes aiming structures that are also described in greater detail below.

A description of the aiming bracket 26 is now provided with specific reference to FIGS. 3, 6, and 8-15. The aiming bracket 26 is a multi-surface formed element that includes a reflector receiving area 54 that is shaped and contoured to receive the reflector 30. Specifically, the reflector receiving area 54 includes a plurality of attachment structures 56 that retain the reflector 30 and the circuit board 28 securely to the aiming bracket 26.

Figure 8:
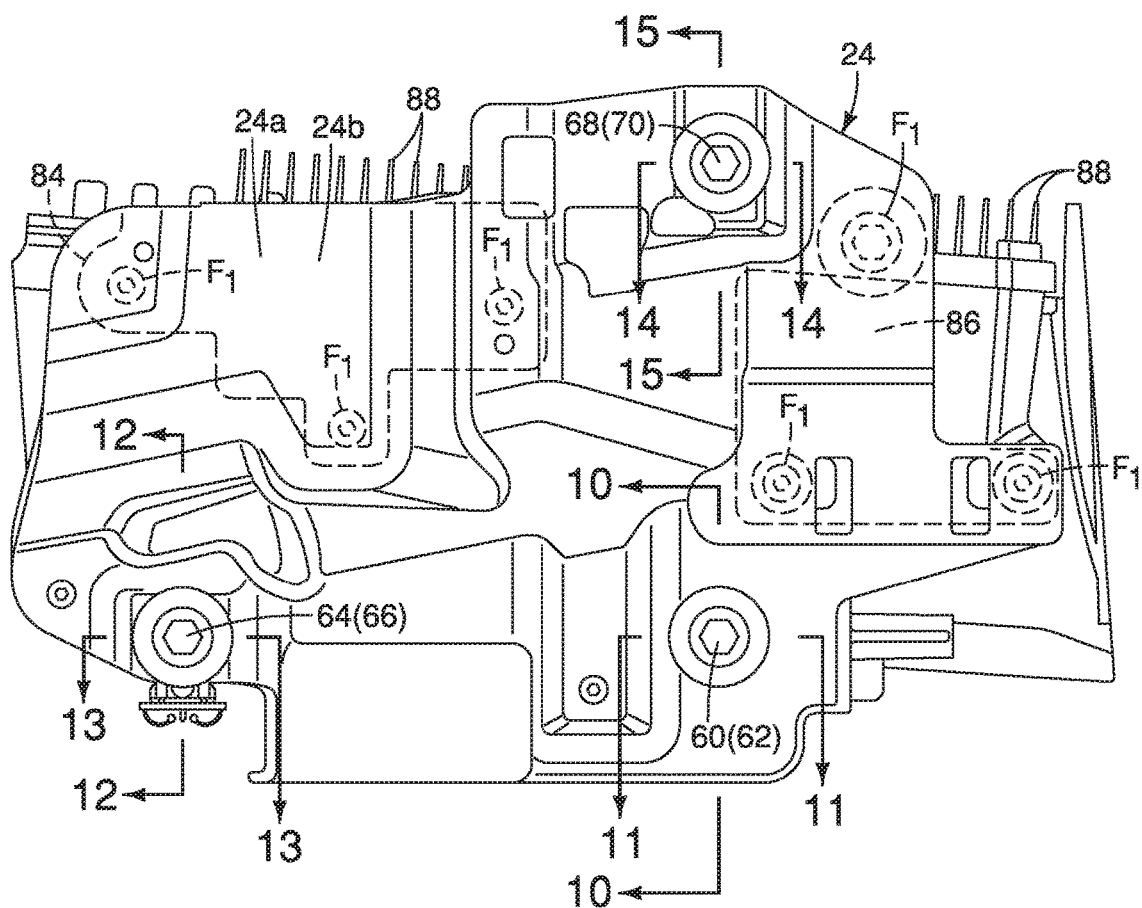
FIG. 8 is a rear view of the housing of the headlamp structure showing aiming portions that provide aiming of the angular adjustments of positions of the bracket and the contoured reflector panel, in order to aim the light projecting therefrom in accordance with the exemplary embodiment.
Figure 10:
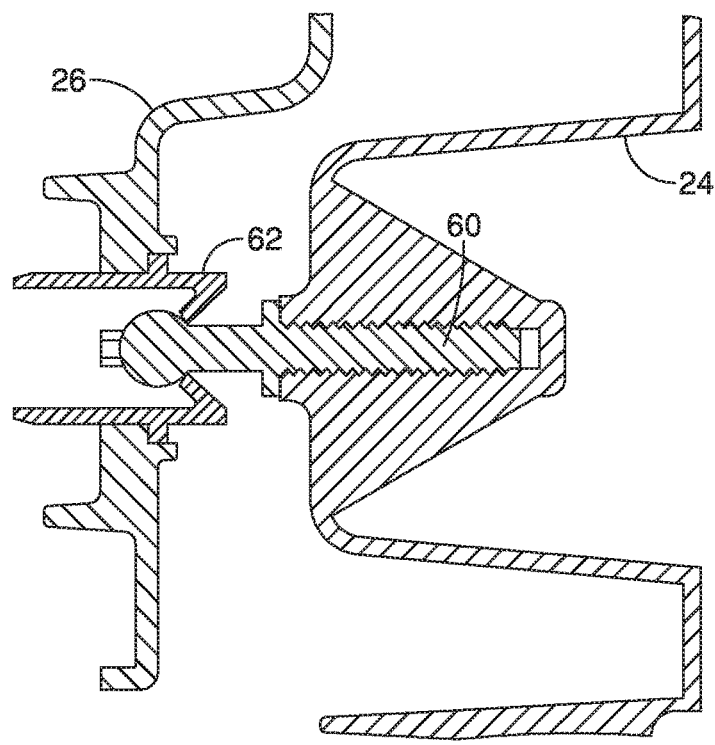
FIG. 10 is a cross-sectional view of a first aiming portion of the housing and a second aiming portion of the aiming panel taken along the line 10-10 in FIG. 8 in accordance with the exemplary embodiment.
Figure 11:
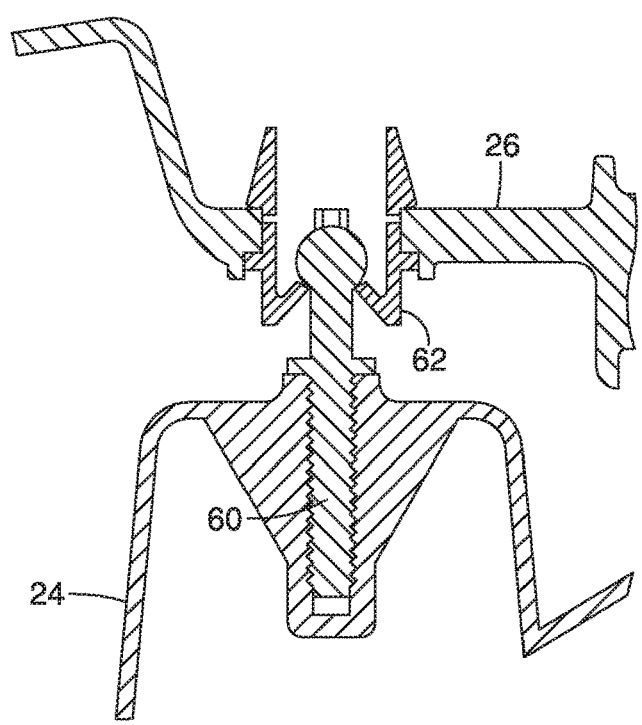
FIG. 11 is another cross-sectional view of the first aiming portion of the housing and the second aiming portion of the aiming panel taken along the line 11-11 in FIG. 8 in accordance with the exemplary embodiment.

The aiming bracket 26 also includes aiming structures that are connected to corresponding aiming structures of the housing 24. A description of aiming structures that adjustably secure the aiming bracket 26 to the housing 24 is now provided with specific reference to FIG. 3, As shown in FIGS. 8, 10 and 11, a rear wall 24a of the housing 24 has a rearward facing surface 24b. The rear wall 24a of the housing 24 includes a first aiming portion 60. The aiming bracket 26 includes a second aiming portion 62 that aligns with the first aiming portion 60 with the aiming bracket 26 installed within the lamp cavity 52 of the housing 24. As shown in FIGS. 10 and 11, the first aiming portion 60 includes a spherical shaped end that is retained by resilient members of the second aiming portion 62. The spherical shaped end allows the aiming bracket 26 to pivot about the spherical shaped end. In other words, the first and second aiming portions 60 and 62 connect the housing 24 and the aiming bracket 26 to one another, but, allow the aiming bracket 26 to pivot during aiming adjustment relative to the housing 24. Put another way, the first aiming portion 60 and the second aiming portion 62, are engaged with one another such that aiming adjustment of the aiming bracket 26 causes movement of the contoured reflector panel 30.

Figure 12:
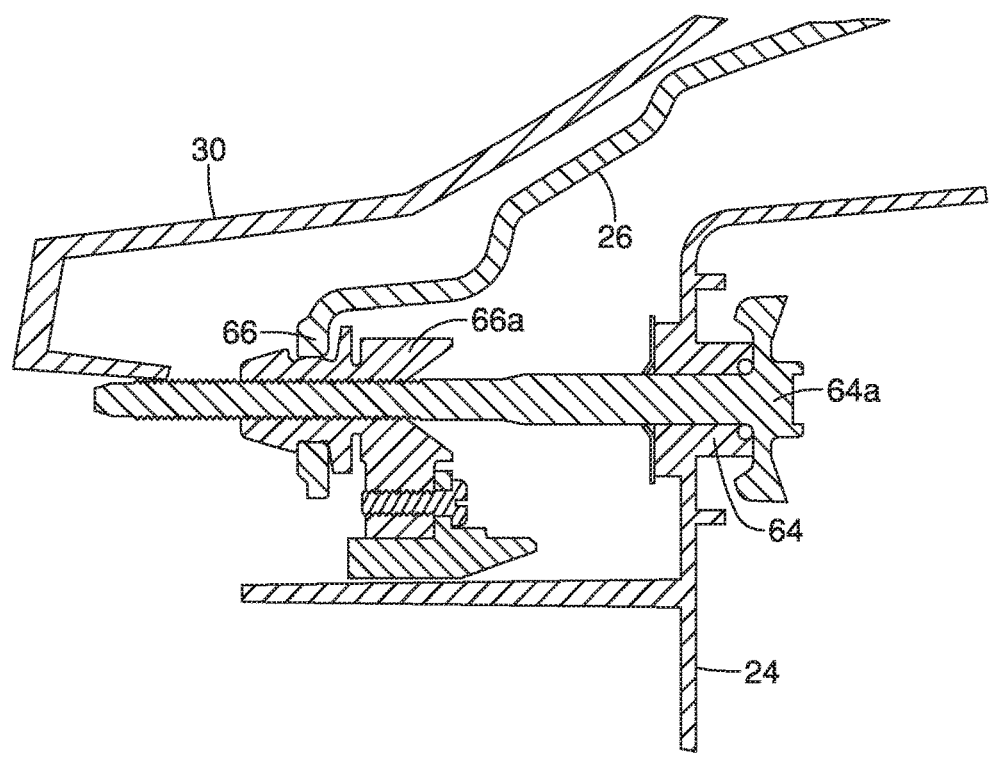
FIG. 12 is a cross-sectional view of a third aiming portion of the housing and a fourth aiming portion of the aiming panel taken along the line 12-12 in FIG. 8 in accordance with the exemplary embodiment.
Figure 13:
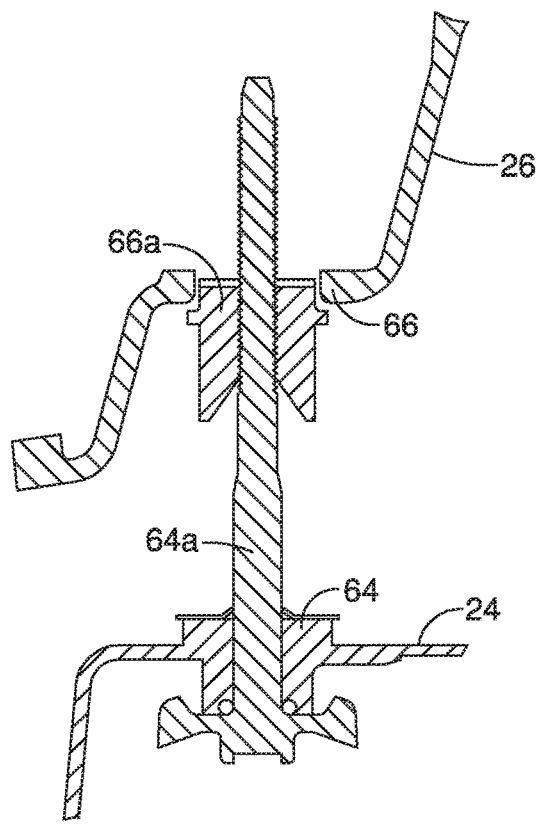
FIG. 13 is another cross-sectional view of the third aiming portion of the housing and the fourth aiming portion of the aiming panel taken along the line 13-13 in FIG. 8 in accordance with the exemplary embodiment.

As shown in FIGS. 8, 12 and 13, the rear wall 24*a* of the housing 24 includes a third aiming portion 64. The aiming bracket 26 includes a fourth aiming portion 66 that aligns with the third aiming portion 64 with the aiming bracket 26 installed within the lamp cavity 52 of the housing 24. As shown in FIGS. 12 and 13, the third aiming portion 64 includes threaded adjuster 64*a* that threads into a threaded receiving structure 66*a* of the fourth aiming portion 66. Rotation of the threaded adjuster 64*a* causes adjustment of the position of the reflector 30 and the aiming bracket 26 about a vertical axis that extends through the first and second aiming portions 60 and 62. Consequently, the threaded adjuster 64*a* aims a beam of light from the reflector 30 in either left or right directions relative to a forward direction of the vehicle 10.

Figure 14:
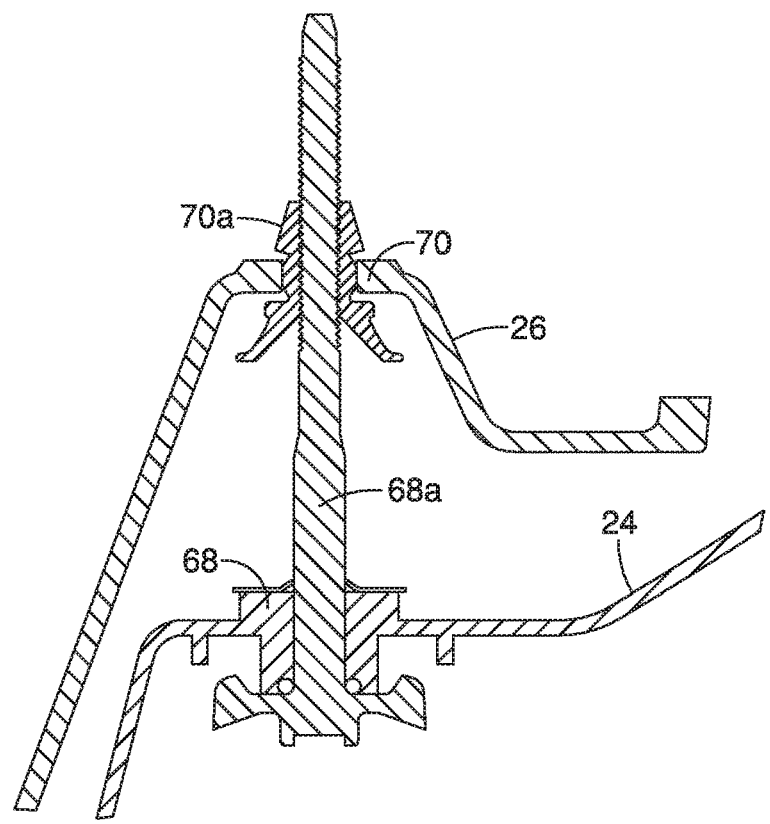
FIG. 14 is a cross-sectional view of a fifth aiming portion of the housing and a sixth aiming portion of the aiming panel taken along the line 14-14 in FIG. 8 in accordance with the exemplary embodiment.
Figure 15:
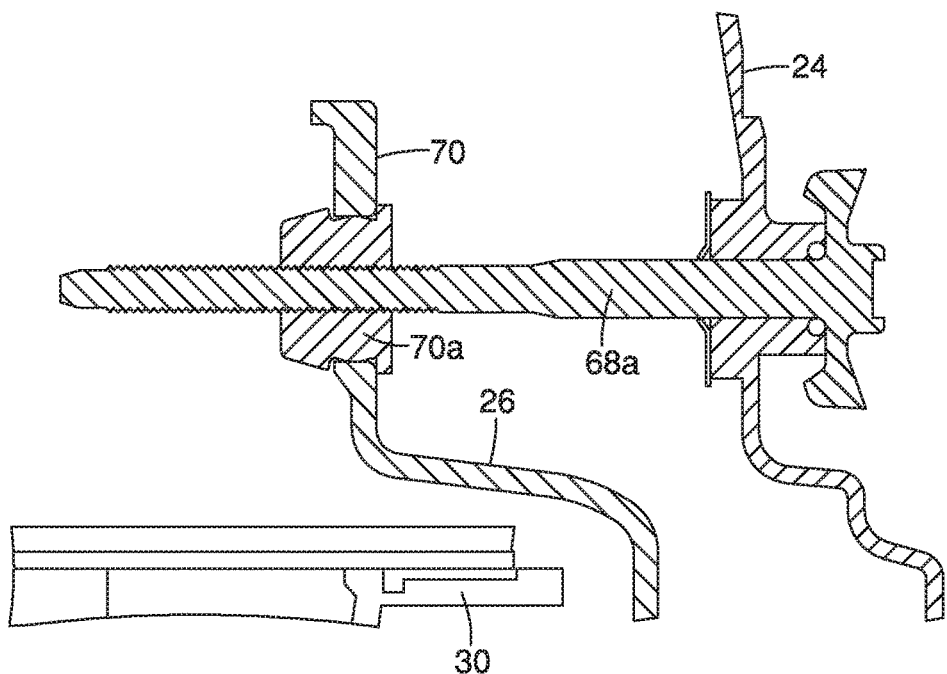
FIG. 15 is another cross-sectional view of the fifth aiming portion of the housing and the sixth aiming portion of the aiming panel taken along the line 15-15 in FIG. 8 in accordance with the exemplary embodiment.

As shown in FIGS. 8, 14 and 15, the rear wall 24*a* of the housing 24 includes a fifth aiming portion 68. The aiming bracket 26 includes a sixth aiming portion 70 that aligns with the fifth aiming portion 68 with the aiming bracket 26 installed within the lamp cavity 52 of the housing 24. As shown in FIGS. 14 and 15, the fifth aiming portion 68 includes threaded adjuster 68*a* that threads into a threaded receiving structure 70*a* of the sixth aiming portion 70. Rotation of the threaded adjuster 68*a* causes adjustment of the position of the reflector 30 and the aiming bracket 26 about a horizontal axis that extends through the first and second aiming portions 60 and 62. Consequently, the threaded adjuster 68*a* aims a beam of light from the reflector 30 in either up or down directions relative to a forward direction of the vehicle 10.

The circuit board 28 includes electric circuits designed to operate headlamp components. The circuit board 28 includes a plurality of low beam light emitters 80 (for example, LEDs—light emitting diodes), a plurality of high beam light emitters 82 (for example, LEDs) shown in FIG. 7, heat sinks 84 and 86 (FIG. 8), and, heat dissipating fins 88.

Figure 7:
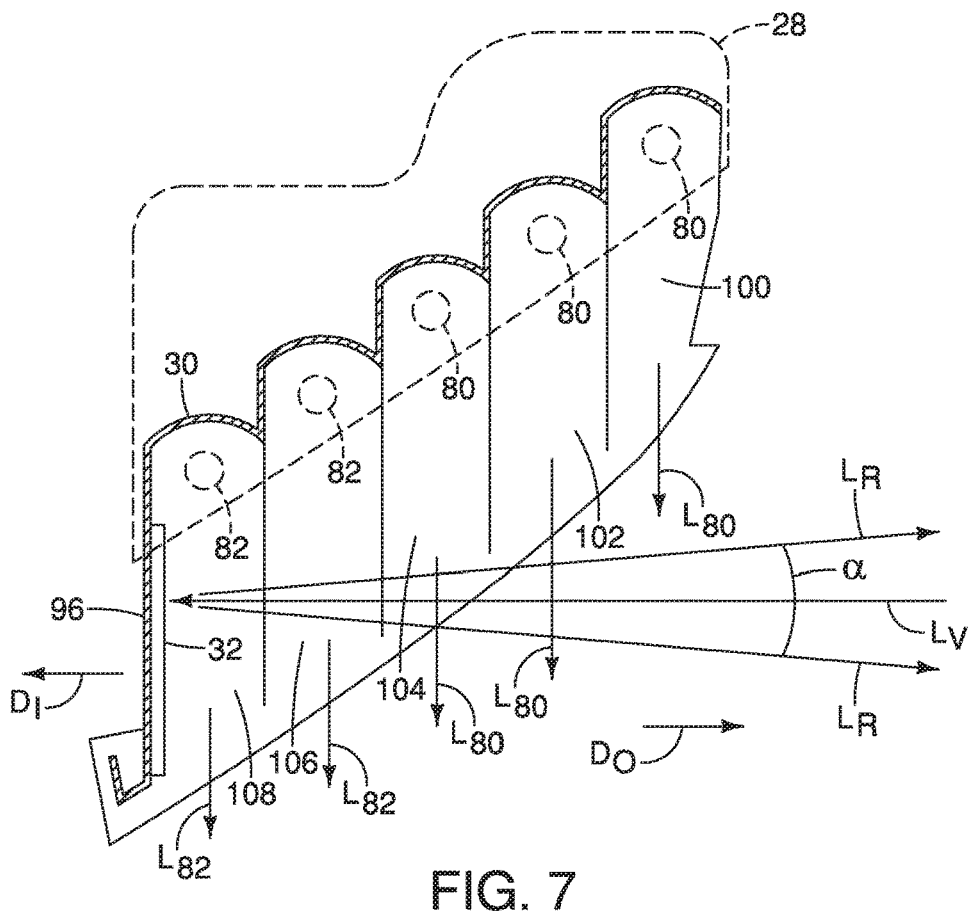
FIG. 7 is a cross-section of the contoured reflector panel removed from the housing along the line 7-7 in FIG. 6, showing directions of illumination of reflector areas of the contoured reflector panel and the reflex reflector taken in accordance with the exemplary embodiment.
Figure 9:
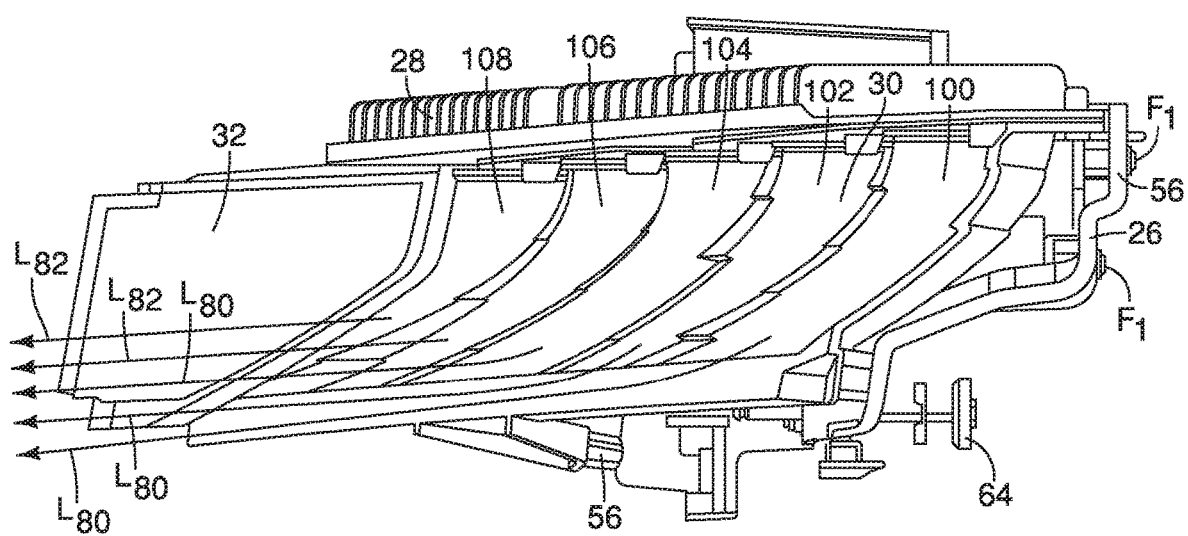
FIG. 9 is a side view of the contoured reflector panel and the circuit board removed from the housing showing details of reflector surface portions and the reflex supporting portion in accordance with the exemplary embodiment.

The circuit board 28 is attached to an upper end of the reflector 30, as shown in FIGS. 7, 8 and 9 via fasteners (not shown). The plurality of low beam light emitters 80 and the plurality of high beam light emitters 82 are aligned with predetermined reflector surface portions of the reflector 30, as indicated in FIG. 7. The heat sinks 84 and 86 (shown in phantom in FIG. 8), are fixed via fasteners Fi to the aiming bracket 26.

A description of the contoured reflector panel 30 (also referred to as the reflector 30) is now provided with specific reference to FIGS. 3, 6 and 7. The reflector 30 has a forward-facing surface 90, a rearward facing surface (not shown), an outboard end 92 (also referred to as an outboard side), an inboard end 94 (also referred to as an inboard side), and a reflex supporting portion 96. The forward-facing surface 90 includes reflector surface portions 100, 102, 104, 106 and 108 that are arranged vertically, side by side and extending along the forward-facing surface 90 between the inboard end 92 and the outboard end 94. The reflex supporting portion 96 extends in the vehicle forward direction from the inboard end 94 of the reflector 30.

The reflector surface portions 100, 102 and 104 are for producing low beam illumination from the headlamp structure 12, and the reflector surface portions 106 and 108 are for producing high beam illumination from the headlamp structure 12, and usually operates in combination with the low beam illumination.

Each of the reflector surface portions 100, 102, 104, 106 and 108 has a similar shape. Specifically, upper ends of each of the reflector surface portions 100, 102, 104, 106 and 108 are rearward of the lower ends of corresponding ones of the reflector surface portions 100, 102, 104, 106 and 108. Further, each reflector surface portions 100, 102, 104, 106 and 108 has a curved contour throughout their length and a semi-circular cross-section throughout their length, as shown in FIG. 7. In other words, each of the reflector surface portions 100, 102, 104, 106 and 108 has a general shape that resembles a chute.

The plurality of low beam light emitters 80 (herein after referred to as the low beam LED 80) and the plurality of high beam light emitters 82 (herein after referred to as the high beam LED 82) are installed at corresponding upper ends of each of the reflector surface portions 100, 102, 104, 106 and 108, as shown in phantom in FIG. 7. More specifically, one low beam LED 80 is positioned at or near the top end of the reflector surface portions 100, another low beam LED 80 is positioned at or near the top end of the reflector surface portions 102, and still another low beam LED 80 is positioned at or near the top end of the reflector surface portions 104.

Similarly, one high beam LED 82 is positioned at or near the top end of the reflector surface portions 106, another high beam LED 82 is positioned at or near the top end of the reflector surface portions 108. It should be understood from the drawings and the description herein that the LEDs 80 and 82 can be fixed to the reflector 30, or, alternatively, can be fixed to the circuit board 28.

Each of the reflector surface portions 100, 102, 104, 106 and 108 is specifically shaped to reflect light from a corresponding one of the LEDs 80 and LEDs 82. More specifically, each of the reflector surface portions 100, 102, 104, 106 and 108 reflects and aims light from the corresponding one of the LEDs 80 and 82 and such that the reflected light shines in forward directions, as represented in FIG. 7 by arrows $L_{80}$ and $L_{82}$.

In the depicted embodiment, the reflector surface portions 100, 102, 104, 106 and 108, the reflex supporting portion 96 of the contoured reflector panel 30 are formed as a single, uniform, monolithic element.

During assembly of the headlamp structure 12, the circuit board 28 is attached to an upper portion of the contoured reflector panel 30, and, the reflex reflector 32 is snap-fitted and/or held by adhesive to the reflex supporting portion 96. Thereafter, the assembled contoured reflector panel 30, the reflex reflector 32 and the circuit board 28 are attached to the aiming bracket 26. Thereafter, the contoured reflector panel 30 and the aiming bracket 26 are installed to the housing 24 and secured to the housing by the aiming portions 60, 62, 64, 66, 68, and 70. Consequently, operation of the aiming portions 60, 62, 64, 66, 68, and 70 aim the aiming bracket and the contoured reflector panel 30 such that the reflected light from the contoured reflector panel 30, as represented in FIG. 7 by arrows $L_{80}$ and $L_{82}$, can be aimed in accordance with predetermined parameters.

A description of the reflex reflector 32 is now provided with specific reference to FIGS. 3 and 7. As mentioned above, the reflex reflector 32 is snap-fitted and/or held by adhesive to the reflex supporting portion 96 of the reflector 30. The reflex reflector 32 has an exposed surface that meets the SAE requirements of a reflex reflector. Specifically, the reflex reflector 32 is provided with either a textured surface, or internal texturing that affects the optical reflective properties of the material that defines the reflex reflector 32, which is typically includes polymer(s) or plastic material(s). Hence, the reflex reflector 32 is not a mirror per se, but does reflect some of the light that shines directly on the exposed surface of the reflex reflector 32. Specifically, incoming light represented in FIG. 7 by the arrow $L_V$ comes from a location outboard of the headlamp structure 24 (and outboard of the vehicle 10). The light $L_V$ is partially diffused and partially reflected, but not in a direct reflection angle. Rather light reflected from the reflex reflector 32, represented by the arrows $L_R$, reflects back within a conical path that has boundaries angularly offset from the path of the light $L_V$. Further, due to the optical characteristics of the reflex reflector 32, the intensity of the light $L_R$ is greatly reduced, as compared to the intensity of the light $L_V$.

Hence, the reflex reflector 32 is referred to herein as a passive reflector because it does not reflect all light it receives. Further, due to the geometry of the headlamp structure 24, its location on the vehicle 10, and the optical properties of the reflex reflector 32, the only light that reaches the reflex reflector 32 for reflection, is light coming from a lateral side of the vehicle 10. For example, when the vehicle 10 is at a stop light or a stop sign, or passing through an intersection, an "other" vehicle traveling along a path perpendicular to the vehicle 10 can shine its headlights on the reflex reflector 32. The operator of the other vehicle will become aware of the vehicle 10 due to the light reflected by the reflex reflector 32, where the light reflected from the reflex reflector 32 comes from the other vehicle.

As shown in FIG. 7, the reflector 30 of the headlamp structure 24 of the vehicle 10, aims light in the vehicle forward direction, as indicated by the arrows $L_{80}$ and $L_{82}$. The light $L_V$ received by the reflex reflector 32 comes from a lateral outboard side thereof with the light $L_V$ projecting in a direction that is perpendicular or approximately perpendicular to the direction of the projection of the light indicated by the arrows $L_{80}$ and $L_{82}$. The light reflected by the reflex reflector 32 projects from the reflex reflector generally within the cone defined by the arrows $L_R$ (reflected light). The arrows $L_R$ are approximately perpendicular to the path of the light from the headlamp structure 24, as represented by the arrows $L_{80}$ and $L_{82}$.

Hence, light from the low beam light emitters 80 (LEDs 80) and the high beam light emitters 82 (LEDs 82) located at the top side proximate respective upper ends of corresponding ones of the plurality of reflector surface portions 100, 102, 104, 106 and 108 is directed in a vehicle forward direction perpendicular to the inboard direction $D_I$ and the outboard direction Do of the vehicle 10. For purposes of clarity, the LEDs 80 and 82, and the reflector surface portions 100, 102, 104, 106 and 108 are active lighting structures. Whereas the reflector surface of the passive reflector 32 (the reflex reflector 32) is configured and oriented such that at least a portion of light approaching the reflex reflector 32 from outboard of the outboard side of the contoured reflector panel is reflected back in the outboard direction.

The various vehicle elements and components of the vehicle 10, other than the headlamp structure 12, are conventional elements and components that are well known in the art. Since such elements and components are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the headlamp structure. Accordingly, these terms, as utilized to describe the present invention should be interpreted relative to a vehicle equipped with the headlamp structure.

The term "configured" as used herein to describe a component, section or part of a device includes structures that is constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A headlamp structure, comprising:
a contoured reflector panel having an inboard side, an outboard side, and a top side, a forward-facing surface and a reflex supporting portion having a front end, the forward-facing surface having a plurality of reflector surface portions extending downwardly from the top side of the contoured reflector panel, each of the plurality of reflector surface portions having a forward end, each of the forward ends of the plurality of reflector surface portions being offset from one another and the front end of the reflex supporting portion relative to a vehicle longitudinal direction such that the forward end of a first reflector surface portion is rearward of the front end by a first distance, the forward end of a second reflector surface portion is rearward of the front end by a second distance greater than the first distance and the forward end of a third reflector surface portion is rearward of the front end by a third distance greater than the first and second distances, and the reflex supporting portion extending forward from the inboard side inboard of the plurality of reflector surface portions;

a passive reflector fixedly attached to the reflex supporting portion with a reflector surface of the passive reflector facing an outboard direction; and a plurality of light emitting elements located proximate respective upper ends of corresponding ones of the plurality of reflector surface portions, the plurality of light emitting elements emitting light to the corresponding one of the plurality of reflector surface portions, with each of the plurality of reflector surface portions being shaped and configured to reflect light from the corresponding one of the plurality of light emitting elements and aim the reflected light to project in a forward direction parallel to the reflector surface of the passive reflector, and, the reflector surface of the passive reflector being configured and oriented such that at least a portion of light approaching the reflector surface of the passive reflector from outboard of the outboard side of the contoured reflector panel is reflected back in the outboard direction.

2. The headlamp structure according to claim 1, wherein the contoured reflector panel including the reflector surface portions and the reflex supporting portion being formed as a single, uniform, monolithic element.

3. The headlamp structure according to claim 1, wherein: the passive reflector is snap-fitted to the reflex supporting portion for movement with the contoured reflector panel.

4. The headlamp structure according to claim 1, further comprising
a housing having a first aiming portion that is located along the rearward facing surface,
an aiming bracket that includes a second aiming portion and a reflector receiving area, with the contoured reflector panel being installed to the aiming bracket such that the first aiming portion and the second aiming portion are engaged with one another such that adjustment of the first aiming portion causes movement of the contoured reflector panel.

5. The headlamp structure according to claim 4, wherein the housing has a main body that defines a plurality of external attachment flanges and an interior lamp cavity, such that the aiming bracket and the contoured reflector panel are installed within the lamp cavity.

6. The headlamp structure according to claim 1, further comprising
a housing having a first aiming portion that is located along the rearward facing surface,
an aiming bracket that includes a second aiming portion and a reflector receiving area, with the contoured reflector panel being installed to the aiming bracket such that the first aiming portion and the second aiming portion are engaged with one another.

7. The headlamp structure according to claim 6, further comprising:
a headlamp housing having a main body that defines a plurality of external attachment flanges and an interior lamp cavity, such that the aiming bracket and the contoured reflector panel are installed within the lamp cavity.

8. A headlamp structure, comprising:
a contoured reflector panel having a forward-facing surface, a rearward facing surface, a plurality of reflector surface portions extending along the forward-facing surface and a reflex supporting portion that has a front end, each of the plurality of reflector surface portions having a forward end, each of the forward ends of the plurality of reflector surface portions being offset from one another and the front end of the reflex supporting portion relative to a vehicle longitudinal direction such that the forward end of a first reflector surface portion is rearward of the front end by a first distance, the forward end of a second reflector surface portion is rearward of the front end by a second distance greater than the first distance and the forward end of a third reflector surface portion is rearward of the front end by a third distance greater than the first and second distances, and the reflex supporting portion extending forward from an inboard side inboard of the plurality of reflector surface portions, the contoured reflector panel, including the reflector surface portions and the reflex supporting portion, being formed as a single, uniform, monolithic element.

9. The headlamp structure according to claim 8, wherein the contoured reflector panel has an inboard end and an outboard end, with the reflector surface portions being located between the inboard end to the outboard end, and
the reflex supporting portion extends in a forward direction from the inboard end of the contoured reflector panel.

10. The headlamp structure according to claim 9, further comprising:
a passive reflector snap-fitted to the reflex supporting portion for movement with the contoured reflector panel such that a reflective surface of the passive reflector faces an outboard direction.

11. The headlamp structure according to claim 8, further comprising:
a passive reflector snap-fitted to the reflex supporting portion for movement with the contoured reflector panel such that a reflective surface of the passive reflector faces an outboard direction.

12. A headlamp structure, comprising:
a headlamp housing having a main body that defines a plurality of external attachment flanges, a lamp cavity and a first adjustment mechanism;
an aiming bracket having a reflector receiving area and a second aiming portion, the aiming bracket being installed to the headlamp housing within the lamp cavity; and
a contoured reflector panel having a plurality of reflector surface portions and a reflex supporting portion having a front end, each of the plurality of reflector surface portions having a forward end, each of the forward ends of the plurality of reflector surface portions being offset from one another and the front end of the reflex supporting portion relative to a vehicle longitudinal direction such that the forward end of a first reflector surface portion is rearward of the front end by a first distance, the forward end of a second reflector surface portion is rearward of the front end by a second distance greater than the first distance and the forward end of a third reflector surface portion is rearward of the front end by a third distance greater than the first and second distances, and the reflex supporting portion extending forward from an inboard side inboard of the plurality of reflector surface portions, the contoured reflector panel, the reflector surface portions and the reflex supporting portion, all being formed as a single, uniform, monolithic element, with the contoured reflector panel being attached to the aiming bracket with the first aiming portion is connected to a second aiming portion.

13. The headlamp structure according to claim 12, wherein
the contoured reflector panel has a forward-facing surface, a rearward facing surface, an outboard end and an inboard end, with the plurality of reflector surface portions extending along the forward-facing surface from the inboard end to the outboard end.

14. The headlamp structure according to claim 13, wherein
the reflex supporting portion extends in a forward direction from the inboard end of the contoured reflector panel.

15. The headlamp structure according to claim 14, further comprising:
a passive reflector snap-fitted to the reflex supporting portion such that a reflective surface of the passive reflector faces an outboard direction.

16. The headlamp structure according to claim 13, wherein
the first aiming portion is located along the rearward facing surface of the contoured reflector panel.

17. The headlamp structure according to claim 12, further comprising:
a passive reflector snap-fitted to the reflex supporting portion such that a reflective surface of the passive reflector faces an outboard direction.

18. The headlamp structure according to claim 12, further comprising
the housing includes a third aiming portion located along the rearward facing surface thereof, spaced apart from the first aiming portion, and
the aiming bracket includes a fourth aiming portion connected to the third aiming portion such that the third aiming portion and the contoured reflector panel undergo limited swiveling movement relative to the fourth aiming and the aiming bracket.

19. The headlamp structure according to claim 18, further comprising
the housing includes a fifth aiming portion located along the rearward facing surface thereof, spaced apart from the first aiming portion and the second aiming portion, and
the aiming bracket includes a sixth aiming portion connected to the fifth aiming portion such that contoured reflector panel is aimed by adjustments to the second and sixth aiming portion, which causes the aiming bracket to undergo swiveling movement relative to the third and fourth aiming portion.

* * * * *